G. B. GATES.
METALLIC PACKING.
APPLICATION FILED MAR. 5, 1914. RENEWED JULY 21, 1919.

1,331,253.   Patented Feb. 17, 1920.

Witnesses:

Inventor:
George B. Gates
by S. W. Bates
Atty.

UNITED STATES PATENT OFFICE.

GEORGE B. GATES, OF PORTLAND, MAINE.

METALLIC PACKING.

1,331,253.  Specification of Letters Patent.  Patented Feb. 17, 1920.

Application filed March 5, 1914, Serial No. 822,734. Renewed July 21, 1919. Serial No. 312,273.

*To all whom it may concern:*

Be it known that I, GEORGE B. GATES, of Portland, in the county of Cumberland and State of Maine, have invented certain new and useful Improvements in Metallic Packings, of which the following is a specification.

My invention relates to metallic packing for piston rods, etc., of that class wherein a mass of strands of soft metal are made into a flexible metallic packing. These packings are operative mainly because of the peculiar property of the metal strands employed to form a skin next to the rod. In use the pressure exerted upon the follower forces the inner strands into contact with the piston rod where they are soon rubbed into a practically continuous skin forming a close-fitting metallic sleeve in which the rod runs. The mass of fibers outside of this skin are readily available to repeat the process whenever from wear this skin may need renewing.

As these packings have usually hitherto been made a covering or binder has been applied for the purpose of holding the mass of compressed metal strands together. A rubber covering vulcanized on has been chiefly used as it has proven to be the most practicable process. The lubrication of rubber covered packing rings must be effected by subsequent external means owing to the difficulty of vulcanizing them in the presence of any available lubricant.

It is desirable that graphite, (or other lubricant adapted to the purpose,) be commingled with the strands to form a mechanical mixture throughout the metallic skin for the purpose of reducing the friction and increasing the life of the close-fitting metallic sleeve formed as heretofore described.

The object of my invention is to make flexible packing rings from uncovered metallic strands commingled with a suitable lubricant.

According to my invention I form packing rings by assembling a mass of metallic strands to form a rope or cord, the outer strands being laid obliquely to the axis of the cord, then changing the cross section of the ring so that the outer strands will resist any tendency to unravel or become displaced. Such a ring will have sufficient flexibility to be installed in a stuffing box around a rod, and yet maintain its compact structure and form of cross section. In practice I twist the mass of strands to form the cord thus giving additional flexibility to the finished product.

My invention may be more readily understood by reference to the accompanying drawing, in which is shown one form in which my invention is embodied.

Figure 1:
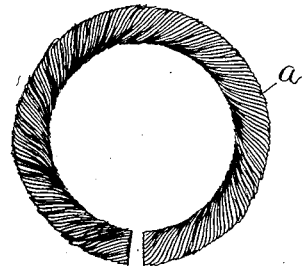
Figure 1 shows a ring made of the twisted rope.

Referring to the drawings, the ring $a$ is a loosely twisted rope having a rough circular cross section, made up from a mass of soft metal strands preferably commingled with grease and graphite or other suitable lubricating material.

Figure 2:
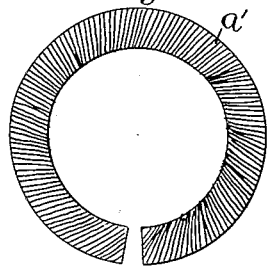
Fig. 2 is the same after being molded in the forming dies.
Figure 3:
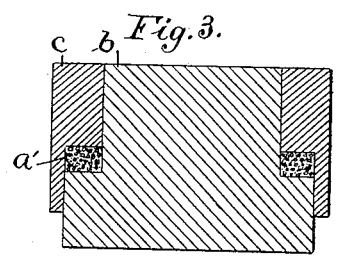
Fig. 3 is a vertical section through the forming dies.
Figure 4:
Fig. 4 is a section through the molded ring.

The loosely twisted ring when pressed between the dies $c$ and $b$ is formed as shown at $a'$ in Figs. 2 and 3, the cross section being changed so as to alter the form of the outer strands and their relation with one another whereby they were free to untwist. As herein shown the cross section of the pressed ring is rectangular and this shape gives each outer strand a well defined angle which tends to retain it in its place and resist any tendency to unravel.

The packing ring thus produced may be of any required form, thickness, length or cross section, but its cross section should be such as to substantially change the cross section of the original rope or cable. My rings as usually made are annular with formed faces and require to be but slightly altered by the pressure of the follower when put into use in the stuffing box.

Figure 5:
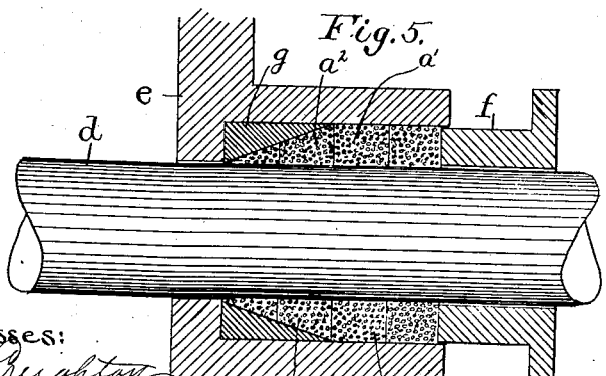
Fig. 5 is a longitudinal section through a stuffing box showing one manner of using my rings.

In Fig. 5 I have shown one of the numerous ways in which my rings may be used.

In this figure $d$ is the rod, $e$ the stuffing box and $f$ the follower. The rings $a'$ are inserted in the usual way and they may be used with cup rings $g$ of triangular cross section whereby the material of the packing rings is pressed inwardly against the rod. The rings $a^2$ as used in the cups are molded for installation therein with inclined backs to fit, as shown in the drawing.

A packing ring produced by my process may be handled and shipped and kept in stock without danger of deterioration or disintegration. There is no detrimental covering or binder of foreign substance to be introduced into the stuffing box.

The oblique formation of the outer strands may be effected otherwise than by twisting as above described.

I claim:—

1. A metallic packing ring having a joint at one side thereof, said ring being composed of a strand of soft metal fibers of which the entire strand is first twisted to form a rope or cable, the cross section of said ring being subsequently so changed by pressure that the fibers tend to retain their relative positions and to form a radially flexible packing ring.

2. A compressed packing ring composed of metal fibers in the form of a strand, said fibers being disposed in cable formation about the axis of said strand.

3. A compressed packing ring of angular cross section composed of metal fibers in the form of a strand, said fibers being disposed in cable formation about the axis of said strand.

In testimony whereof I have affixed my signature, in presence of two witnesses.

GEORGE B. GATES.

Witnesses:
S. W. BATES,
C. B. CREIGHTON.